US007988905B2

(12) United States Patent
Hashiba et al.

(10) Patent No.: US 7,988,905 B2
(45) Date of Patent: Aug. 2, 2011

(54) PROCESS FOR PRODUCING WOODY MOLDING

(75) Inventors: Masanori Hashiba, Kariya (JP); Hideki Kawashiri, Kariya (JP); Takashi Inoh, Toyota (JP); Hisashi Okuyama, Toyota (JP); Hiroshi Urayama, Toyota (JP); Katsuhiko Mochizuki, Mishima (JP); Yuhei Maeda, Mishima (JP)

(73) Assignees: Toyota Boshoku Kabushiki Kaisha, Aichi (JP); Toyota Jidosha Kabushiki Kaisha, Aichi (JP)

( * ) Notice: Subject to any disclaimer, the term of this patent is extended or adjusted under 35 U.S.C. 154(b) by 631 days.

(21) Appl. No.: 10/593,220

(22) PCT Filed: Mar. 17, 2005

(86) PCT No.: PCT/JP2005/004802

§ 371 (c)(1), (2), (4) Date: Sep. 18, 2006

(87) PCT Pub. No.: WO2005/087468

PCT Pub. Date: Sep. 22, 2005

(65) Prior Publication Data

US 2007/0176315 A1 Aug. 2, 2007

(30) Foreign Application Priority Data

Mar. 17, 2004 (JP) ................................ 2004-076516

(51) Int. Cl.
*B27N 3/08* (2006.01)

(52) U.S. Cl. .................... 264/331.21; 264/299; 264/319

(58) Field of Classification Search ................. 264/122, 264/299, 319, 331.21
See application file for complete search history.

(56) References Cited

U.S. PATENT DOCUMENTS

| | | | | |
|---|---|---|---|---|
| 5,605,981 | A * | 2/1997 | Imamura et al. | 525/440.04 |
| 5,773,562 | A * | 6/1998 | Gruber et al. | 528/354 |
| 6,150,438 | A * | 11/2000 | Shiraishi et al. | 524/35 |
| 2002/0128344 | A1 | 9/2002 | Fujihira et al. | |
| 2003/0038405 | A1 * | 2/2003 | Bopp et al. | 264/319 |
| 2003/0109605 | A1 | 6/2003 | Bond et al. | |

FOREIGN PATENT DOCUMENTS

| | | | |
|---|---|---|---|
| JP | 3359764 | | 7/1996 |
| JP | 09-169897 | * | 6/1997 |
| JP | 11-106628 | | 4/1999 |
| JP | 2000-033607 | | 2/2000 |
| JP | 2000-127117 | | 5/2000 |
| JP | 2001-303489 | * | 10/2001 |
| JP | 2002-356560 | | 12/2002 |
| JP | 2003-055871 | | 2/2003 |
| JP | 2004-130796 | | 4/2004 |
| JP | 2004-284246 | | 10/2004 |
| JP | 2005-014499 | * | 1/2005 |
| WO | WO 03/016015 A1 | | 2/2003 |

OTHER PUBLICATIONS

Office Action from Japanese Patent Office, mailed Dec. 15, 2009.

* cited by examiner

*Primary Examiner* — Khanh Nguyen
*Assistant Examiner* — John Blades
(74) *Attorney, Agent, or Firm* — Patterson Thuente Christensen Pedersen, P.A.

(57) ABSTRACT

The invention provides a method for manufacturing a molded woody article, which includes compression molding a base material containing wood fibers, polylactic acid fibers and an inorganic filler at a temperature not less than a melting point of the polylactic acid fibers, and maintaining the molded base material at a temperature close to a crystallization temperature of the polylactic acid fibers for a desired period of time, thereby crystallizing the polylactic acid fibers. In the molding step, the base material is entirely deformed and molded into a desired shape while the polylactic acid fibers are melted, and in the crystallizing step, the polylactic acid fibers are solidified, thereby producing the molded article. In the crystallizing step, polylactic acid crystallizes rapidly and reliably utilizing the inorganic filler as a crystal nucleating agent.

6 Claims, No Drawings

PROCESS FOR PRODUCING WOODY MOLDING

TECHNICAL FIELD

The present invention relates to a method for manufacturing a molded article that contains a woody material as a main component.

BACKGROUND ART

A vehicle interior panel and the like can be constructed from a molded article that is made of a material that is prepared by processing a woody material, one of non-petroleum resources, into small pieces such as fibers, and adding a binder resin thereto, instead of a plastic molded article. Examples of the binder resin that is used in such a molded article may include polyolefins such as polypropylene. However, the polyolefins may have a large environmental load because the polyolefins are mainly produced from a petroleum resource and the polyolefins are disposed after use. Accordingly, it has been proposed to use, for example, cellulose-base materials, starch-base materials and aliphatic polyesters that can be mainly obtained from non-petroleum resources that have a small environmental load if they are used as a binder resin (Patent Document 1). In particular, polylactic acid, one of the aliphatic polyesters, is expected to be used as a binder resin because polylactic acid can be mass-produced from non-petroleum resources.

Patent Document 1: JP 2003-55871 A

DISCLOSURE OF THE INVENTION

Problems to be Solved by the Invention

However, polylactic acid has a glass transition point around 60° C., and the rigidity and the like of polylactic acid significantly reduce at a temperature greater than the glass transition point. Accordingly, it is difficult to use polylactic acid in order to form a molded article such as a vehicle interior member that can be exposed to a high temperature higher than 60° C. It has been found that a non-crystalline region of polylactic acid can be fluidized at a temperature not less than the glass transition point, thereby reducing the rigidity of polylactic acid. In view of the foregoing, a method of improving the heat resistance of polylactic acid is to increase a crystalline region of polylactic acid in order to reduce the non-crystalline region. However, according to this method, after the molded article is formed, the molded article must be maintained at a temperature close to a crystallization temperature for a long time. As a result, it takes a long time to produce the molded article.

It is, accordingly, one object of the present invention to provide a method for manufacturing a molded woody article in a short time while a crystallinity of polylactic acid as a binder resin is maintained at a higher level.

Means for Solving the Problem

In order to achieve the above-described object, an aspect of the present invention is to provide a method for manufacturing a molded woody article that includes the steps of compression molding a base material containing wood fibers, polylactic acid fibers and an inorganic filler at a temperature not less than a melting point of said polylactic acid fibers, and maintaining said molded base material at a temperature close to a crystallization temperature of said polylactic acid fibers for a desired period of time, thereby crystallizing the polylactic acid fibers.

According to this method, in the molding step, the base material is entirely deformed and molded into a desired shape while the polylactic acid fibers are melted, and in the crystallizing step, the polylactic acid fibers are solidified, thereby producing the molded article. In the crystallizing step, polylactic acid crystallizes rapidly and reliably utilizing the inorganic filler as a crystal nucleating agent. In addition, polylactic acid crystallizes from portions contacting the wood fibers. Therefore, according to the production method, it is possible to obtain a molded woody article that contains reliably crystallized polylactic acid in a short time.

Further, the term "a temperature close to a crystallization temperature" refers to a temperature in the range of the crystallization temperature ±20° C.

In addition, in a preferred embodiment of the present invention, the inorganic filler contained in the base material is dispersed into the polylactic acid fibers. According to the method, the polylactic acid fibers are mixed to the wood fibers, so that the inorganic filler can be easily and favorably dispersed into the base material. Therefore, polylactic acid can be uniformly crystallized during the crystallizing step. Further, the inorganic filler can be easily dispersed, for example, if it is added to and kneaded with polylactic acid before polylactic acid is processed to a fibrous form.

In addition, in another preferred embodiment of the present invention, the inorganic filler contained in the base material may be talc. Although many types of known inorganic fillers may be used as the inorganic filler, talc is more preferable because talc can significantly reduce the time for the crystallizing step.

In still another preferred embodiment of the present invention, in the molding step, the base material is prepared such that the ratio of the wood fibers to the polylactic acid fibers may be in the range of 7:3 to 5:5 by weight. According to this method, the wood fibers favorably bind with each other, so that a molded woody article having good rigidity can be obtained via the shortened crystallizing step.

EFFECT OF THE INVENTION

According to the present invention, a method is provided for manufacturing a molded woody article in a shorter time while a crystallinity of polylactic acid as a binder resin is maintained at a higher level. As a result, a molded woody article having good heat resistance can be produced at high efficiency.

BEST MODE FOR CARRYING OUT THE INVENTION

The best mode for carrying out the present invention will be described hereinafter in detail. In a method for manufacturing a molded woody article according to the present invention, it is possible to produce a known molded article in which wood fibers are bound by a binder resin. Such a molded article can be obtained by press forming. In particular, the molded article can be used in, for example, a vehicle interior panel, e.g., a door inner panel and an instrument panel; a cover for a structural part such as a pillar, a sheet and a steering wheel; an interior material or a lining for a building or any other vehicle; and a structural member for furniture.

In the present manufacturing method, a base material containing wood fibers, polylactic acid fibers and an inorganic filler is used. The wood fibers are fibers available from a woody material. Examples of raw materials of the wood fibers include known woody plants and grass plants. The wood fibers having a long fiber length are preferable because the long wood fibers may increase strength, rigidity or other such properties of the molded woody article. Accordingly, the relatively long wood fibers are preferably used. Therefore, in this respect, when grass plants are used, a bast plant may be advantageously used. Examples of the bast plant may include sisal, jute and kenaf. Kenaf is particularly preferable because it grows rapidly, can be easily cultured and provides high-quality fibers.

The wood fibers are obtained by defibrating the harvested grass plants or woody plants. The wood fibers may generally be long and thin materials. Generally, the wood fibers are materials obtained via a defibration process that includes a treatment for removing hemi-cellulose or other such compounds existing between the fibers, thereby loosening the fibers. For example, the wood fibers are materials obtained via the defibration process that can be obtained by utilizing chemicals such as sulfuric acid or by utilizing biodegradation mechanism. In the grass plants such as kenaf, exodermis of kenaf is removed after harvest. Thereafter, kenaf is exposed to water rich in microorganisms such as river water for a desired period of time (known as letting) and washed, thereby decomposing and removing fiber connective tissues without breaking the fibers. After fiber-to-fiber connection is reduced, the material is dried. In order to form the base material, the dried materials are then mechanically defibrated by means of a fleecing, an aeration or other such means, if necessary. The wood fibers obtained via the letting process are preferable because such fibers may have good moldability and provide the molded article with increased properties derived from the fibers. This is because such fibers contain reduced amounts of lignin or hemi-cellulose and the fibers are more easily maintained in this state. It is preferable that the wood fibers may have, but is not limited to, a diameter of 16 to 22 μm. Such fibers are expected to have good moldability and to promote crystallization of polylactic acid.

The polylactic acid fibers are materials obtained by forming polylactic acid into fibers utilizing a known fiber forming method, by crimping the formed fibers, if necessary, and by cutting the fibers so as to have a desired length. Polylactic acid may preferably have high crystallization performance. Examples of preferable polylactic acid may include, but are not limited to, polylactic acid consisting of D-lactic acid or L-lactic acid because such polylactic acid has high crystallization performance. In addition, polylactic acid is not limited to polylactic acid in which D- and L-lactic acid are mixed at a desired ratio. For example, polylactic acid may contain molecular chain parts that are derived from hydroxycarboxylic acids, aliphatic polyhydric alcohols and aliphatic polyvalent hydroxylic acids in addition to lactic acid. In addition, polylactic acid may contain polylactic acid copolymers produced by polymerizing other aliphatic polyesters to the extent that the properties of polylactic acid are not deteriorated. Examples of such copolymers may include dibasic acid polyesters such as poly-3-hydroxybutyrate, polyethylene succinates, polybutylene succinates and polybutylene adipates. Polylactic acid, polylactic acid copolymers or other such compounds as described above can be produced by a known method. Therefore, a detailed description of these compounds may be omitted.

Polylactic acid may preferably be polylactic acid that has a crystallinity not less than 30% to a crystallization rate of 100% because polylactic acid may have a good heat resistance by crystallization. That is, polylactic acid having the crystallinity of 30% to 50% to the crystallization rate of 100% is preferable. In addition, polylactic acid that can easily attain the crystallinity not less than 30% is more preferable. Further, the term "a crystallization rate of 100%" means a state in which the crystallizable parts of polylactic acid are entirely crystallized.

The inorganic filler that is contained in the base material is a known inorganic filler such as calcium carbonate, talc, mica, synthetic hydrated silica and powdered silica stone. Examples of those shapes may include, but are not limited to, a granular shape, a cone shape, a needle shape and a flake shape. Also, the size of each may vary. For example, the inorganic filler having a particle size of 100 nm to 10 μm can be favorably used. The inorganic filler may preferably be talc which may significantly increase the crystallization speed.

The amount of the inorganic filler to be added may be, but is not limited to, 0.1 wt % or more with respect to polylactic acid, and preferably 0.1 wt % to 5 wt %. When the amount of the inorganic filler is less than 0.1 wt % with respect to polylactic acid, the crystallization speed may not be significantly increased. A large amount of the inorganic filler may effectively increase the crystallization speed. However, an excessively large amount of the inorganic filler, in particular, the inorganic filler greater than 5 wt % may increase the weight of the molded article or make the molded article brittle.

Further, a ratio of polylactic acid to the wood fibers is not limited. However, in the base material before a molding step, the ratio of the wood fibers to polylactic acid may preferably be in the range of 7:3 to 5:5 by weight. When the ratio of polylactic acid is less than 7:3 in the ratio of the wood fibers to polylactic acid, the formed molded article may have a reduced rigidity. Conversely, when the ratio of polylactic acid is greater than 5:5 in the ratio of the wood fibers to polylactic acid, the amount of polylactic acid relatively increases. As a result, the contact between polylactic acid and the wood fibers are restricted, thus the crystallization speed may not be increased. In addition, in view of the fact that the base material contains wood fibers, inorganic filler and any other known additive as well as polylactic acid, the content of polylactic acid in the base material may preferably be in the range of 29 wt % to 49 wt %. In such a content of polylactic acid, a reduction in rigidity of the molded article can be suppressed. Also, the wood fibers can be favorably bound to each other, and the crystallization speed can be increased.

The preparation of the base material is not limited to a particular method. However, the base material may generally be prepared by mixing the wood fibers and the polylactic acid fibers and then forming the mixture into a mat shape having a desired contour. For example, the wood fibers and the polylactic acid fibers are fed into a hopper at a desired ratio, so as to be defibrated by an aeration. Thereafter, the defibrated fibers are assembled at a desired amount, thereby forming webs. Desired numbers of the formed webs are then laminated and are combined with each other by needle punching or other such methods, thereby forming the base material. The inorganic filler can be applied thereto in a dispersion state by electrostatically adhering the inorganic filler or by immersing the fiber mat in a suspension liquid containing the inorganic filler. The inorganic filler can be applied thereto at any stage after the webs are formed. The inorganic filler may preferably be added into softened polylactic acid at a desired ratio before polylactic acid is formed into the polylactic acid fibers. When the polylactic acid fibers are mixed with the wood fibers, the inorganic filler can be favorably dispersed into the base material. In this case, the inorganic filler can be prevented from falling from the mat-shaped fibers of the base material, so that the inorganic filler is stably maintained in a desired content.

The method for manufacturing the molded woody article according to the present invention will be described hereinafter. The method for manufacturing the molded woody article according to the present invention includes a molding step and a crystallizing step.

In the molding step, the base material is compression molded at a temperature not less than a melting point of the polylactic acid fibers. The base material may preferably be preheated to the temperature not less than the melting point by using, for example, an oven. Also, a molding die for molding the base material may preferably be heated to a temperature less than the melting point. In particular, the molding die may preferably be heated to a temperature of the crystallizing step, which step will be described later, i.e., a temperature close to a crystallization temperature of the polylactic acid fibers (the crystallization temperature ±20° C.). After the base material heated to the temperature not less than the melting point of the polylactic acid fibers is set in the molding die, it is pressed so as to be provided with a shape.

In the molding step, a plurality of pressing operations may be performed under the temperature not less than the melting point of the polylactic acid fibers. For example, first, the mat-shaped base material is heated to the temperature less than the melting point of the polylactic acid fibers, and is then sandwiched and pressed between a pair of flat plates so as to be molded into a flat plate shape. Subsequently, the flat plate-shaped base material is further pressed in the molding die having a desired shape to be obtained after it is heated again to the temperature less than the melting point of the polylactic acid fibers. According to this method, a draw molding or other such molding can be performed while preventing the fibers from moving each other. In addition, it is possible to reduce non-uniformity in thickness of the product and to avoid the product from producing "transparency."

After completion of the molding step, the base material is subjected to the crystallizing step. In the crystallizing step, the molded base material is maintained at the temperature close to the crystallization temperature of the polylactic acid fibers, so that the polylactic acid in the base material is crystallized. The crystallizing step may be performed by cooling the base material once after completion of the molding step, and subsequently by heating the base material again. However, it is typically performed by successively treating the base material heated in the molding step after completion of the molding step. Therefore, it is possible to reduce the number of heating operations. This may lead to improvement of working efficiency. The crystallizing step can be performed by removing the base material from the molding die and then by introducing the base material into an oven or other such devices. However, the crystallizing step may preferably be performed while the base material is maintained in the molding die. Thus, the base material may be prevented from deforming in shape. Also, it is possible to use a molding die different from the molding die used in the molding step in order to perform the crystallizing step. However, the crystallizing step is preferably performed while the base material is maintained in the molding die used in the molding step. This is because the base material is cooled rapidly if it is once removed from the molding die used in the molding step.

In the crystallizing step, the base material is maintained at the temperature close to the crystallization temperature of the polylactic acid. For example, the crystallization temperature of pure polylactic acid obtained from DSC temperature fall measurement (rate of temperature fall of 3° C./min) is about 105° C. Also, the crystallization temperature of polylactic acid containing 1 wt % of talc is about 125° C. Therefore, the base material is maintained at 100° C. to 110° C. When the base material is maintained in the molding die that is previously heated to the temperature close to the crystallization temperature as described above, the molding die is maintained at 100° C. to 110° C. In this case, in the molding step, the base material is heated to the temperature not less than the melting point of polylactic acid, for example, a temperature not less than 200° C., before the base material is set in the molding die. Therefore, the temperature of the base material reduces from the start of the molding step toward the end of the molding step (the melting point of pure polylactic acid is about 179° C.). Accordingly, the base material is maintained in the molding die, so as to reach the temperature close to the crystallization temperature that is required in the crystallizing step. The molding die is maintained at the temperature close to the crystallization temperature, preferably a temperature slightly lower than the crystallization temperature. Therefore, the base material positioned inside the molding die can be favorably maintained at the temperature close to the crystallization temperature.

In the crystallizing step, polylactic acid crystallizes at a higher temperature utilizing the inorganic filler as a crystal nucleating agent. In addition, because polylactic acid initiates the crystallization at the higher temperature, polylactic acid can crystallize such that molecular chains can actively move. Also, the crystallization can be rapidly performed in a favorable arrangement. This may lead to an increased crystallization speed. Further, the wood fibers and polylactic acid may favorably contact each other in the base material. Such a contact may contribute the rapid crystallization of polylactic acid. In addition, in the presence of the wood fibers, polylactic acid crystallizes at a rate higher than a rate that is expected from a rate of pure polylactic acid. The mechanism that the wood fibers promote the crystallization of polylactic acid is unclear. However, it is considered that tips or other such portions of the wood fibers may act as a crystal nucleating agent. Further, the crystallization speed of polylactic acid may also change depending on the degree of contact between polylactic acid and the wood fibers. Therefore, it is expected that the crystallization can be guided by regulating arrangement and movement of the molecular chains. Thus, the time required for the crystallizing step in the present manufacturing method is shortened. The crystallizing step is performed for a period of time such that the crystallinity of polylactic acid is 30% or more. Preferably, the crystallizing step is performed for a period of time so that the crystallization rate of polylactic acid may be sufficiently increased, more preferably, until the crystallization rate reaches substantially 100%. Even in this case, the crystallizing step can be completed within 60 seconds.

In particular, when the molded article is manufactured, by utilizing the present manufacturing method, from the base material in which the ratio of the wood fibers to polylactic acid is in the range of 7:3 to 5:5 by weight and in which the ratio of the inorganic filler to polylactic acid is in the range of 0.1 wt % to 5 wt %, the base material may preferably be molded such that the molded base material may have a density of 0.5 g/cm$^3$ or more. If the molded article is formed under such a condition, the time required for the crystallizing step is favorably shortened. Also, the molded woody article having good rigidity can be obtained. In particular, the crystallization rate of 100% can be achieved within 30 seconds.

Upon completion of the crystallizing step, the base material is cooled, so that the molded woody article can be obtained. The obtained molded woody article is subjected to appropriate treatments such as deburring and surface covering, so as to produce various products.

Further, the molded woody article obtained by this method has a bending strength greater than that of a molded woody article that does not contain the inorganic filler, provided that the molded article has the same crystallinity as that of the present molded woody article. This is attributed to the fact that a uniform crystalline region is formed when the inorganic filler promotes the crystallization, so that the entire strength of the resultant molded article can be more uniform. This is also attributed that a more regular crystal may be formed, so that the crystalline region itself may have an increased strength.

EXAMPLES

Example 1

Polylactic acid was added with "CARBODILITE HMV-8CA" (manufactured by Nisshinbo Industries, Inc.) as a polyimide compound (for preventing hydrolysis) and talc "SG-2000" (an average particle size of 1.0 μm; manufactured by NIPPON TALC Co., Ltd.) at a ratio of 1.0 wt % with respect to polylactic acid, respectively, thereby preparing a mixture. The mixture was formed into fibers utilizing a known method and was crimped. The formed fibers were cut so as to have a length of 51 mm, thereby forming polylactic acid fibers (containing talc) that can be used as materials for forming a base material. Conversely, kenaf bast fibers formed by a known method were cut so as to have a length of 70 mm, thereby forming wood fibers that can be used as the materials for forming the base material. The wood fibers and the polylactic acid fibers were mixed at a ratio of 70:30 by weight. The mixed fibers were defibrated and were formed into sheet-shaped webs. A plurality of webs were laminated and were subjected to needle punching, thereby forming a base material having a basis amount of 1.6 kg/M$^2$. In this way, a plurality of base materials were formed.

Next, each of the base materials were sandwiched between two flat plate-shaped dies together with a spacer having a thickness of 2.5 mm. Thereafter, the dies were heated to 230° C. and pressed under a pressure of 12 kg/cm$^2$ for 40 seconds, thereby forming a plate-shaped pre-molded article. The pre-molded article was introduced into an oven heated to 230° C. and was heated for 150 seconds, so that the interior side of the base material was heated to 210° C. Thereafter, the pre-molded article was sandwiched between dies preheated to 100° C. together with a spacer having a thickness of 2.3 mm, so as to be pressed under a pressure of 12 kg/cm$^2$ for various periods of time, thereby forming a plurality of board-shaped molded woody article having a basis amount of 1.5 kg/m$^2$, a thickness of 2.3 mm and an apparent density of 0.7 g/cm$^3$.

Example 2

Similar to Example 1, a plurality of molded woody articles having a different pressing time were formed. However, the basis amount of each of the base materials was changed to 1.0 kg/m$^2$. Also, the basis amount, the thickness and the apparent density of each of the final molded woody articles were respectively changed to 0.9 kg/m$^2$, 2.3 mm and 0.4 g/cm$^3$.

Example 3

Similar to Example 1, base materials were formed except that the wood fibers and the polylactic acid fibers were mixed at a ratio of 50:50 by weight. Also, under the same heat and pressure as Example 1, a plurality of molded woody articles having a different pressing time were formed. The basis amount, the thickness and the apparent density of each of the molded woody articles were respectively 1.5 kg/m$^2$, 2.3 mm and 0.7 g/cm$^3$.

Example 4

Similar to Example 1, base materials were formed except that the wood fibers and the polylactic acid fibers were mixed at a ratio of 30:70 by weight. Also, under the same heat and pressure as Example 1, a plurality of molded woody articles having a different pressing time were formed. The basis amount, the thickness and the apparent density of each of the molded woody articles were respectively 1.5 kg/m$^2$, 2.3 mm and 0.7 g/cm$^3$.

(Control 1)

Similar to Example 1, polylactic acid fibers were formed except that talc was not added. Similar to Example 1, base materials as controls were formed by using the polylactic acid fibers thus formed. Also, under the same heat and pressure as Example 1, a plurality of molded woody articles having a different pressing time were formed. The basis amount, the thickness and the apparent density of each of the molded woody articles were respectively 1.5 kg/m$^2$, 2.3 mm and 0.7 g/cm$^3$.

(Control 2)

Similar to Example 3, base materials were formed by using the polylactic acid fibers formed in Control 1. Under the same heat and pressure as Example 3, a plurality of molded woody articles having a different pressing time were formed. The basis amount, the thickness and the apparent density of each of the molded woody articles were respectively 1.5 kg/m$^2$, 2.3 mm and 0.7 g/cm$^3$.

(Control 3)

Similar to Example 4, base materials were formed by using the polylactic acid fibers formed in Control 1. Under the same heat and pressure as Example 4, a plurality of molded woody articles having a different pressing time were formed. The basis amount, the thickness and the apparent density of each of the molded woody articles were respectively 1.5 kg/M$^2$, 2.3 mm and 0.7 g/cm$^3$.

(Measurement of Crystalline State)

Each of the molded woody articles of Examples 1 to 4 and Controls 1 to 3 were cut away while maintaining a thickness of 2.3 mm, so as to form a sample having a weight of about 10 mg. The sample was examined in order to determine a minimum pressing time required for heat generated by crystallization of a binder resin to became 0 (crystallization rate of 100%). The examination was carried out by using a differential scanning calorimeter (DSC-50; manufactured by Shimadzu Corporation). Results are shown in Table 1.

TABLE 1

| | Weight ratio in base material | | | | |
|---|---|---|---|---|---|
| | Kenaf fiber — | Polylactic acid fiber (containing talc) — | Talc content wt % with respect to polylactic acid | Density of molded article g/cm$^3$ | 100% crystallization time Seconds |
| Example 1 | 70 | 30 | 1.0 | 0.7 | 25 |
| Example 2 | 70 | 30 | 1.0 | 0.4 | 50 |
| Example 3 | 50 | 50 | 1.0 | 0.7 | 25 |
| Example 4 | 30 | 70 | 1.0 | 0.7 | 40 |
| Control 1 | 70 | 30 | — | 0.7 | 180 |
| Control 2 | 50 | 50 | — | 0.7 | 240 |
| Control 3 | 30 | 70 | — | 0.7 | 360 |

As will be apparent from Table 1, in Examples 1 to 4 containing talc, the crystallization rate of 100% is accomplished within 1 minute. To the contrary, in Controls 1 to 3, a time required for the crystallization rate to reach 100% is 3 minutes or more. This demonstrates that when talc is added to the molded woody article containing the wood fibers in which the polylactic acid fibers are used as the binder resin, the crystallization time can be remarkably reduced. In addition, in comparing between Example 1 and Control 1, between Example 3 and Control 2 and between Example 4 and Control 3, which pairs respectively have the same mixing ratio of the wood fibers and the polylactic acid fibers and the same heating and pressing condition, the time required for the crystallizing step in each of Examples is reduced to 1/7 to 1/9. In addition, two types of board-shaped molded articles having the same shape as the Examples were formed by extrusion molding of polylactic acid only and talc containing polylactic acid. The molded articles thus formed were heat treated in dies preheated to 100° C. to 110° C. The crystallization time of the molded article formed from polylactic acid only was 200 minutes. Also, the crystallization time of the molded article formed from talc containing polylactic acid was 10 minutes. This result suggests that the wood fibers, i.e., kenaf fibers, may promote the crystallization of polylactic acid.

Examples 1, 3 and 4 having the same density are compared. In Examples 1 and 3 in which the polylactic acid fiber contents in the base material before pressing are respectively 30 wt % and 50 wt %, the time required for the crystallization rate to reach 100% are the same. However, in Example 4 in which the polylactic acid fiber content in the base material is 70 wt %, the time required for the crystallization rate to reach 100% is extended to 40 seconds, which is 1.5 times of Examples 1 and 3. This means that the polylactic acid fiber may effectively reduce the crystallization time if its content in the base material before pressing is in the range of 30 wt % to 50 wt %.

In addition, Examples 1 and 2 that are similar to each other except that the densities of the final molded woody articles are different from each other are compared. Example 2 having the apparent density of 0.4 g/cm$^3$ requires the crystallization time two times longer than Example 1 having the apparent density of 0.7 g/cm$^3$. Therefore, it is considered that polylactic acid may crystallize rapidly when polylactic acid is compressed, in particular, when there is sufficient contact with the wood fibers.

The invention claimed is:

1. A method for manufacturing a molded woody article, comprising:

compression molding a mat-shaped base material containing wood fibers, polylactic acid fibers made of polylactic acid having a crystallinity of 30% to 50% to a crystallization rate of 100%, and an inorganic filler at a temperature not less than a melting point of said polylactic acid fibers, thereby forming a flat plate-shaped base material; and maintaining said molded base material at a temperature close to a crystallization temperature of said polylactic acid fibers for a period of time that allows a crystallinity of 30% to 50% of the polylactic acid fibers, thereby crystallizing the polylactic acid fibers;

wherein in the compression molding step, the base material is prepared such that a ratio of the wood fibers to the polylactic acid fibers is in a range of 7:3 to 5:5 by weight, and a ratio of the inorganic filler to the polylactic acid fibers is in a range of 0.1 to 5% by weight; and wherein the molded woody article has a density in a range of 0.5 g/cm$^3$ to 0.7 g/cm$^3$.

2. The method for manufacturing a molded woody article according to claim 1, wherein the inorganic filler contained in the base material is dispersed into the polylactic acid fibers.

3. The method for manufacturing a molded woody article according to claim 1, wherein the inorganic filler contained in the base material is talc.

4. The method for manufacturing a molded woody article according to claim 1, wherein the period of time is between 25 seconds and 50 seconds.

5. The method for manufacturing a molded woody article according to claim 1, wherein a crystallization rate of 100% can be achieved during the maintaining step within a desired time of 30 seconds.

6. The method for manufacturing a molded woody article according to claim 1, wherein said molded base material is maintained at 100° C. to 110° C.

* * * * *